(12) United States Patent
Hertz et al.

(10) Patent No.: US 6,761,262 B2
(45) Date of Patent: Jul. 13, 2004

(54) LINEAR CONVEYOR SYSTEM

(75) Inventors: Roger Barry Hertz, Burlington (CA); Daniel Curtis McCrackin, Hamilton (CA)

(73) Assignee: Thermo CRS LTD (CA)

( * ) Notice: Subject to any disclaimer, the term of this patent is extended or adjusted under 35 U.S.C. 154(b) by 0 days.

(21) Appl. No.: 09/870,075

(22) Filed: May 30, 2001

(65) Prior Publication Data

US 2002/0179411 A1 Dec. 5, 2002

(51) Int. Cl.⁷ .......................... B65G 13/02; B65G 37/00
(52) U.S. Cl. ........................ 198/803.14; 198/346.2
(58) Field of Search ..................... 198/803.14, 798, 198/345.1, 346.2

(56) References Cited

U.S. PATENT DOCUMENTS

| | | | | |
|---|---|---|---|---|
| 2,740,244 A | * | 4/1956 | Belli ..................... | 198/803.14 |
| 3,050,173 A | * | 8/1962 | Wimmer ................ | 198/803.14 |
| 3,138,239 A | * | 6/1964 | Ackerman et al. ...... | 198/803.14 |
| 4,911,286 A | * | 3/1990 | Herzke .................. | 198/803.14 |
| 5,096,670 A | | 3/1992 | Harris et al. | |
| 5,101,966 A | * | 4/1992 | Lapeyre ................ | 198/803.14 |
| 5,287,957 A | * | 2/1994 | Iuchi et al. ............ | 198/803.14 |
| 5,346,050 A | * | 9/1994 | Mojden et al. ........ | 198/803.14 |
| 5,774,153 A | * | 6/1998 | Kuehnle et al. ........... | 347/129 |
| 6,082,077 A | * | 7/2000 | Christ ................... | 198/803.14 |
| 6,095,316 A | | 8/2000 | Redden | |
| RE37,194 E | * | 5/2001 | Kirk et al. ................. | 205/335 |
| 6,237,754 B1 | * | 5/2001 | Tjabringa et al. ...... | 198/803.14 |
| 6,267,930 B1 | * | 7/2001 | Ruediger et al. ........... | 422/130 |

FOREIGN PATENT DOCUMENTS

| | | |
|---|---|---|
| DE | 43 09 888 A1 | 9/1994 |
| EP | 0 195 907 A2 | 10/1986 |
| JP | 0414481 | 5/1992 |

* cited by examiner

*Primary Examiner*—Douglas Hess
(74) *Attorney, Agent, or Firm*—Piper Rudnick LLP

(57) ABSTRACT

A conveyor system for moving articles, such as microtiter plates and the like, includes an endless belt with dividing ribs spaced to accommodate and position the plates to be moved. The belt is driven by a servo motor.

4 Claims, 4 Drawing Sheets

LINEAR CONVEYOR SYSTEM

BACKGROUND OF THE INVENTION

1. Field of the Invention

The present invention relates to a conveyor apparatus. More specifically, the invention relates to a conveyor system for linearly transporting articles such as microtiter plates.

2. Description of the Prior Art

Conveyors are well known for moving objects between different locations and typically include an endless belt or chain moving uni-directionally between different stations. The advent of robotic systems has increased the dependency on conveyor systems to move work pieces accurately between different workstations, as human intervention is no longer available to ensure accurate positioning or to make real time adjustments to the location of the work piece.

Where registration of the work piece on a conveyor is necessary, it is known to provide stops alongside the belt conveyor that provide an abutment for the work piece and inhibit relative movement between the work piece and the conveyor belt. Such an arrangement is shown in U.S. Pat. No. 6,095,316 to Redden in which a pair of endless chains or belts are located on opposite sides of a slide way and engage the rear edge of the work piece. Such an arrangement, however, involves a large number of mechanical parts and requires an accurate registration between the chains to obtain correct alignment of the work piece and the conveyor.

One particular area in which the use of robotics has been widely deployed is in the pharmaceutical research laboratory where biological samples, usually contained on microtiter plates, are to be moved between different test equipment without human intervention. In such an environment accurate positioning of the plates is critical and at the same time, the conveyor must be reliable and have as few moving parts as possible to avoid undue complexity.

It is therefore an object of the present invention to provide a conveyor in which the above disadvantages are obviated or mitigated.

SUMMARY OF THE INVENTION

According, therefore, to one aspect of the present invention, there is provided a conveyor for moving an article along a predetermined path the conveyor having an endless belt entrained about a pair of supports spaced apart along the path. A support surface on the belt receives the article, and a drive moves the belt relative to the supports along the path. The support surface has a pair of abutments to inhibit relative movement between the article and the belt along the predetermined path.

According to a farther aspect of the invention, there is provided a conveyor system to move an article along a predetermined path. The system comprises a pair of workstations and a conveyor extending along the predetermined path between the pair of workstations. The conveyor has an endless belt entrained about a pair of supports spaced apart along the path with a support surface on the belt to receive the article. A drive moves the belt relative to the supports along the path. The support surface having a pair of abutments positioned on the belt to engage oppositely directed surfaces on the article and inhibit relative movement between the belt and the article along the path.

BRIEF DESCRIPTION OF THE DRAWINGS

An embodiment of the invention will now be described by way of example only with reference to accompanying drawings in which.

DESCRIPTION OF THE PREFERRED EMBODIMENTS

Figure 1:
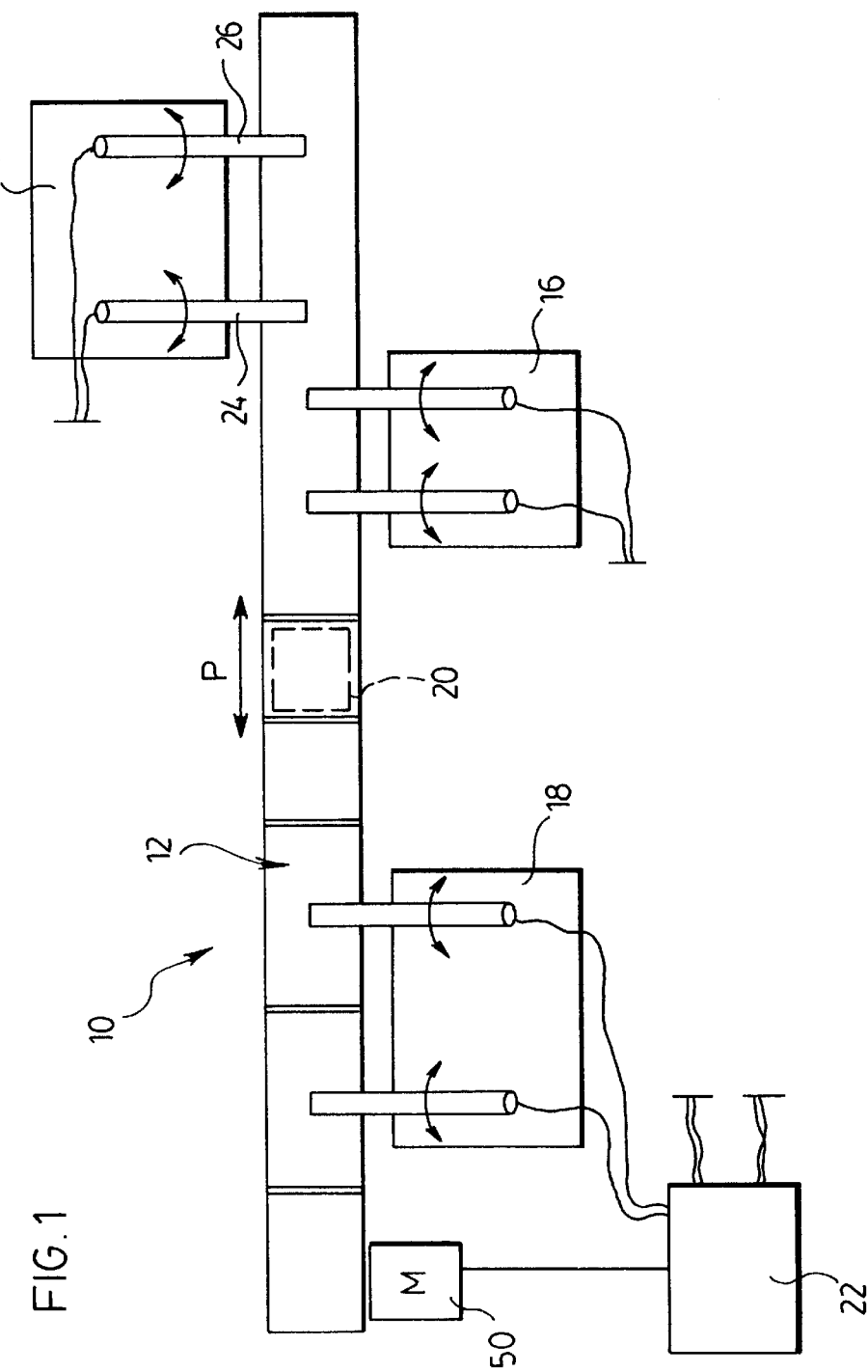
FIG. 1 is a schematic representation of a conveyor system.

Referring therefore to FIG. 1, a conveyor system 10 includes a conveyor 12 extending between workstations 14, 16, and 18. The conveyor 12 moves articles 20 along the predetermined path indicated by the arrow "P" between respective ones of the workstations 14, 16 and 18 under the control of a controller 22.

Each of the workstations 14, 16 and 18 has a pair of robotic arms 24, 26 controlled through the controller 22 to perform specific operations on the articles 20. Each of the arms 24, 26 is independently controlled for operation on the articles 20 and it will be appreciated that the nature of the operations and the nature of the arms 24, 26 will depend upon the articles to be conveyed. The details of the arms 24, 26 and their specific operations are well known in the art and need not be further described at this time.

Figure 2:
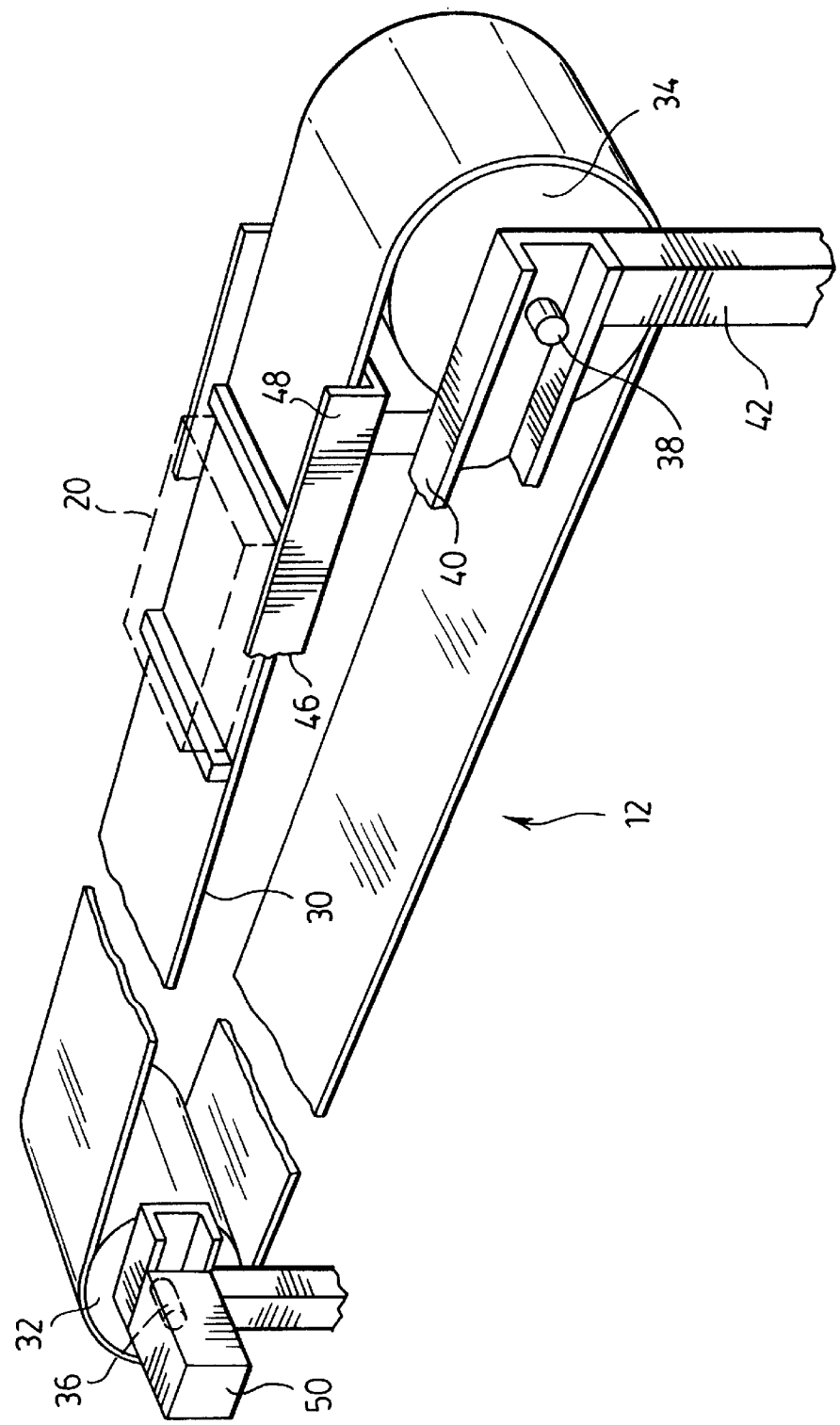
FIG. 2 is a perspective view of a portion of the conveyor system shown in FIG. 1.
Figure 3:
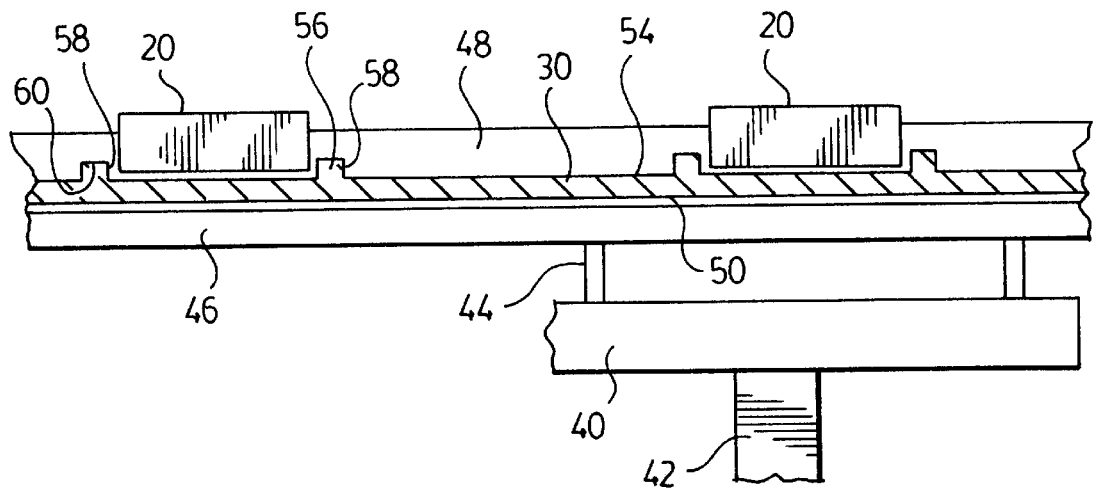
FIG. 3 is a longitudinal cross-sectional view of FIG. 2.

As can best be seen in FIG. 2, the conveyor 12 includes an endless belt 30 entrained about a pair of support rollers 32, 34. The rollers 32, 34 are rotatably mounted on spindles 36, 38 respectively and are maintained in spaced relationship by side frames 40 that extend along the length of the conveyor 12. The side frames 40 are supported on legs 42 to maintain the conveyor 12 at the required height and cross members 44 maintain the side frames 40 in spaced relationship. The belt 30 is supported between the rollers 32 on a slide 46, which is supported on the cross members 44. The slide 46 may be made of a suitable low friction material such as a high-density polyethylene that allows the belt 30 to slide smoothly between the rollers. Side rails 48 are secured to the slide 46 and project above the belt 12 to locate articles 20 laterally relative to the belt.

A servo motor 50 is secured to the spindle 36 associated with the roller 32 and rotates the roller 32 to impart linear motion to the belt 30. The servo motor 50 is reversible and is controlled from the controller 22 to move the belt 30 in either direction along the path P. The servo motor 50 will be controlled from the controller 22 using standard closed loop control techniques implemented by the controller so that the position of a particular location on the belt 30 is known at any given time. Such controllers and servo motors are readily available, such as those available from Kollmorgen of Radford, Va.

Figure 4:
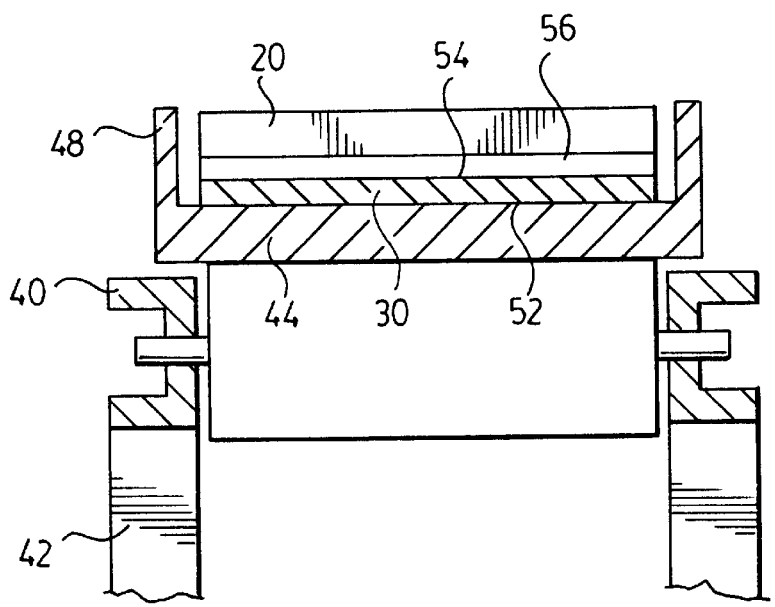
FIG. 4 is a transverse cross-sectional view of FIG. 3.

The endless belt 30 has oppositely directed surfaces, namely a drive surface 52 and support surface 54, as shown in FIG. 4. The drive surface 52 cooperates with the rollers 32, 34 and slide 46, whereas the support surface 54 supports the articles 20. Ribs 56 are provided on the support surface 54 at spaced intervals and extend laterally across the belt 30 in a direction normal to the predetermined path P. The ribs 56 in one preferred embodiment are of square cross section having side faces 58 and an upper face 60. The ribs 56 are arranged in pairs along the length of the belt 30 with opposed side faces 58 of each pair spaced apart a distance slightly greater than the overall length L of the article 20. The spacing between the opposed side faces 58 provides a snug fit for the article 20 without unduly hampering the placement and removal of the article 20 on the belt 30. The side faces 58 provide abutments for the article 20 and thereby inhibit relative movement between the belt 30 and the article 20 along the path P.

In operation, the servo motor 50 moves the belt 30 such that a pair of ribs are positioned at one of the workstations 14, 16, 18 at which an article is to be placed in the belt 30. The arm 24 places the article on the belt so that it is received between the ribs 56 and thereby secured against unintentional movement. At the same time, articles located at other workstations 14, 16, 18 may operated upon by the respective arms 24, 26 either by removal and replacement with an alternate article or a specific operation performed by the arm on that article.

After completion of the operation by the arms 24, 26 at each of the work station 14, 16, 18, the servo motor 50 under the control of the controller 22 drives the belt 30 to position the article adjacent another of the arms 24, 26. This may be another arm at the same workstation or may be moved to a different workstation for further operation to be performed. Again, once the set of operations at each workstation is completed, the controller 22 operates through the servo motor to move the article 20 to another position.

Movement of the belt 30 may be in either direction by virtue of the reversible nature of the servo motor 50 with the location of the articles 20 on the belt secured in either direction by the abutments provided by the ribs 56. The side rails 48 prevent lateral displacement so that the article 20 is securely located on the belt 30. The article 20 may thus be moved between workstations in either direction permitting operations to be performed at each workstation by each of the robotic arms independently of the other operations. Upon completion of the operations on the article, it is moved to an arm 24, 26 for removal from the belt whilst a further article is placed on the belt by another one of the arms.

A typical application for the conveyor system 10 is found in a pharmaceutical research laboratory where the article 20 may be a microtiter plate with the operations performed at the robotic arm the placement and removal of the plates from the belt and test operations performed on the contents of the plate. In such an application, the plates typically have a dimension of 5.030" by 3.365" and a depth of 0.565". With such an embodiment, it has been found that the appropriate spacing between the side faces 58 of the ribs 56 has a clearance of 0.040" on the overall length to facilitate placement of the articles 20.

In the preferred embodiment the belt 30 is a flexible urethane belt and the ribs 56 are urethane blocks with a cross section of 0.100"×2.800". Clearly, custom belts may be provided from a suitable flexible structure such as a nylon reinforced polymer with the ribs 56 molded integrally with the support surface 54. The ribs may be of other suitable forms, for example a series of buttons or ledges rather than a continuous rib if preferred.

As shown, the ribs are arranged as discrete pairs along the length of the support surface. In an alternative embodiment where the desired spacing of the articles permits, each of the ribs may separate adjacent articles so that a continuous array of articles is provided. Each of the side faces 58 then acts as an abutment.

It will be noted that the conveyor 12 provides a simple but effective mechanism for moving articles 20 in either direction along the path between workstations. Joint operation of the robotic arms is facilitated and the use of the reversible servo motor avoids complicated mechanism for moving the belt.

Figure 5:
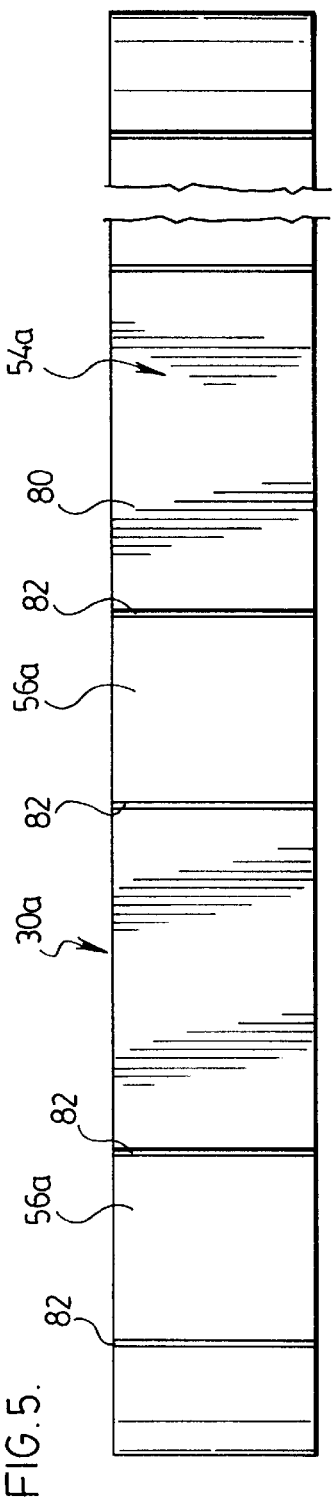
FIG. 5 is a plan view of a belt for use with the conveyor system of the present invention; and, FIG. 6 is a side elevation of the belt of FIG. 5.
Figure 6:
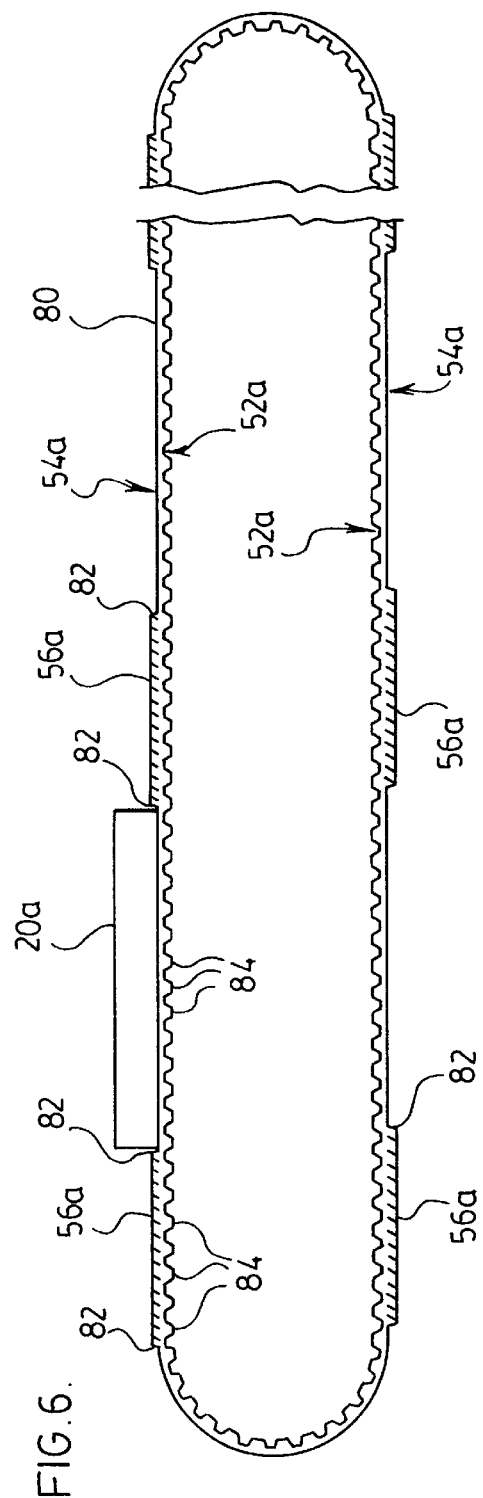

FIGS. 5 and 6 illustrate details of the belt of the invention according to a preferred embodiment and wherein similar reference numerals are used as with the previously described figures but with the letter "a" added for clarity. As shown, the belt 30a includes a drive surface 52a and a support surface 54a. The ribs 56a according to the illustrated embodiment, also extend laterally across the width of the belt, on the support surface 54a thereof, as described above. However, in this embodiment, the ribs 56a also partly extend along the longitudinal direction of the belt, thereby resulting in ribs 56a that assume a pad-like appearance on the belt 30a. The spaces between the ribs 56a provide for "nests" 80 for receiving the articles 20a, as described before. As indicated above, such articles 20a may comprise, for example, microtiter plates as illustrated.

The belt 30a illustrated in FIGS. 5 and 6 allow for the articles 20a to be placed on the belt 30a such that they are spaced apart by a greater distance than in the embodiment described previously. It will be understood by persons skilled in the art that the size of the ribs 56 or 56a will vary on the desired spacing of the articles 20a being transported and, as such, any size of same may be used.

As also illustrated in FIG. 6, the side faces of the ribs are preferably provided with chamfered edges 82, which facilitates the positioning of the article 20a into the "nests" 80 on the belt 30a.

The belt 30a illustrated in FIG. 6 also preferably includes cogs 84 on the drive surface 52a that cooperate with complementary cogs on the rollers (not shown).

Although the invention has been described with reference to certain specific embodiments, various modifications thereof will be apparent to those skilled in the art without departing from the spirit and scope of the invention as outlined in the claims appended hereto.

What is claimed is:

1. A conveyor system to move microtiter plates along a predetermined path, comprising a pair of workstation, a conveyor extending along said predetermined path between said pair of workstations, said conveyor having an endless belt entrained about a pair of supports spaced apart along said path, a support surface on said belt to receive said plates and a drive to move said belt relative to said supports along said path, said support surface having a pair of raised abutments positioned on said belt to engage oppositely directed surfaces on said plates and inhibit relative movement between said plates and said belt along said path, wherein said drive comprises a servo motor to position said belt relative to said workstations and wherein said servo motor is reversible to move said belt in either direction along said path.

2. The system of claim 1 wherein said belt provides planar surfaces extending between said abutments to engage and support a bottom surface of said plates.

3. The system of claim 1 wherein said place and remove said plates between said pair of abutments on said belt.

4. The system of claim 1 wherein said servo motor is controlled by a controller for positioning said plates on the belt in desired locations along said path.

* * * * *

UNITED STATES PATENT AND TRADEMARK OFFICE
CERTIFICATE OF CORRECTION

PATENT NO.   : 6,761,262 B2
DATED        : July 13, 2004
INVENTOR(S)  : Roger Barry Hertz et al.

It is certified that error appears in the above-identified patent and that said Letters Patent is hereby corrected as shown below:

Column 4,
Line 38, replace "workstation" with -- workstations wherein each said workstation includes an independently adjustable robtoic device for moving said plates off of said belt and back onto said belt --.
Line 54, after "said", insert -- devices --.

Signed and Sealed this

Fifth Day of April, 2005

JON W. DUDAS
*Director of the United States Patent and Trademark Office*